C. L. LUMBY.
COOKING VESSEL SUPPORTING DEVICE.
APPLICATION FILED FEB. 13, 1920.

1,406,399.

Patented Feb. 14, 1922.

INVENTOR.
Charles L. Lumby
BY
ATTORNEYS.

UNITED STATES PATENT OFFICE.

CHARLES L. LUMBY, OF CHICAGO, ILLINOIS.

COOKING-VESSEL-SUPPORTING DEVICE.

1,406,399.     Specification of Letters Patent.    Patented Feb. 14, 1922.

Application filed February 13, 1920. Serial No. 358,356.

*To all whom it may concern:*

Be it known that I, CHARLES L. LUMBY, citizen of the United States, residing at Chicago, in the county of Cook and State of Illinois, have invented new and useful Improvements in Cooking-Vessel-Supporting Devices, of which the following is a specification.

The device which is the subject matter of the present application for patent is in the nature of a combined lid and tray for cooking vessels, the same being constructed to support a second cooking vessel inside the first for a purpose to be hereinafter described.

The invention has for its object to provide a device of the kind stated which is very simple in construction, and which can be used in two different positions for different kinds of cooking.

With the objects stated in view, the invention consists in a novel combination and arrangement of parts to be hereinafter described and claimed, and in order that the same may be better understood, reference is had to the accompanying drawing forming a part of this specification.

Figure 1:
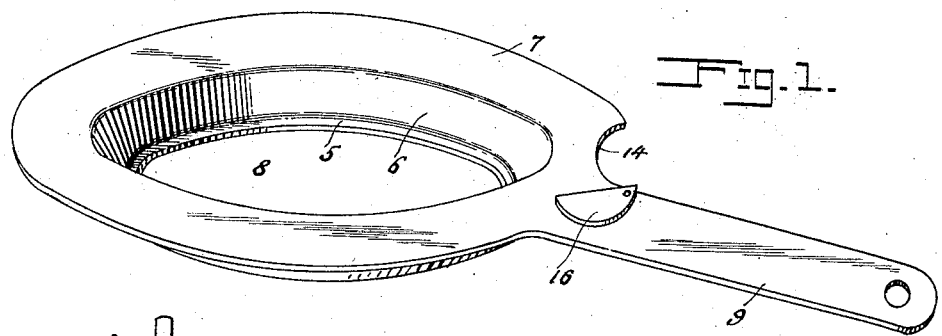
Figure 2:
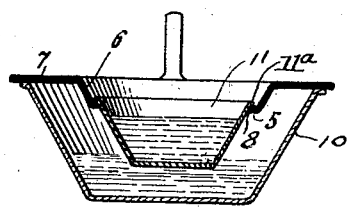
Figure 4:
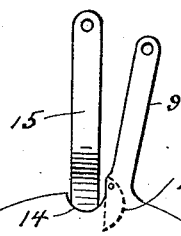
Figure 3:
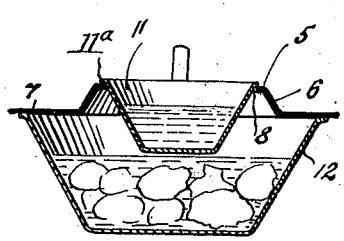

In the drawing Figure 1 is a perspective view of the device; Figs. 2 and 3 are sectional views thereof showing the different ways it may be used, and Fig. 4 is an enlarged plan view of the device as shown in Fig. 3.

Referring specifically to the drawing, the device resembles a soup plate, it being provided with a bottom 5, a side wall 6 and an outstanding marginal rim 7 at the top. The bottom 5 has a large circular hole 8, and the rim 7 has a handle 9. These parts can all be made in one piece, the material used being stout sheet metal.

Fig. 2 shows the device seating on a cooking vessel 10 in the same manner as a lid, with the bottom 5 supporting another cooking vessel 11 which seats in the opening 8 and extends down into the vessel 10, spaced from the bottom and side of the latter. The food to be cooked is placed in the vessel 11, and water is placed in the vessel 10 into which the vessel 11 dips. The contents of the vessel 11 are cooked by heating the water in the vessel 10, the operation being similar to that of a double boiler. It will be understood that the vessel 11 has a marginal rim 11ª by which it is supported on the part 5.

Figure 3 shows the device supported in inverted position on top of a cooking vessel 12, and also supporting a vessel 11 as before. However, the vessel 11 now does not extend down into the vessel 12 as far as before, it being supported near the top thereof, due to the upstanding position of the wall 6. The device now serves as a lid for the vessel 12 and a support for the vessel 11, permitting potatoes or other food articles to be cooked in the vessel 12, and any other articles in the vessel 11. The lid function of the device is obtained by the closure of the hole 8 by the vessel 11.

At the junction of the handle 9 with the rim 7 is a side recess 14 to receive the handle 15 of the vessel 12, and adjacent to said recess is a pivoted wing 16 to cover the same when the device is applied to a vessel provided with a handle which would not be in the way.

I claim:

A support for a cooking vessel comprising a member having a bottom provided with an opening to seat the vessel, an upstanding encircling wall rising from the bottom, an outstanding marginal rim at the top of said wall, a handle extending laterally from the rim, said rim having an edge recess adjacent to one side of the handle, and a pivoted closure for the recess.

In testimony whereof I affix my signature.

CHARLES L. LUMBY.